US012749233B2

(12) United States Patent
Singh et al.

(10) Patent No.: US 12,749,233 B2
(45) Date of Patent: Sep. 29, 2026

(54) ELECTRONIC STICKER PACKS GENERATED BY ARTIFICIAL INTELLIGENCE BASED ON USER PROMPT

(71) Applicant: Microsoft Technology Licensing, LLC, Redmond, WA (US)

(72) Inventors: Aryan Singh, Noida (IN); Gaurav Vinayak Tendolkar, Reston, VA (US); Devesh Singh, Noida (IN)

(73) Assignee: Microsoft Technology Licensing, LLC, Redmond, WA (US)

(*) Notice: Subject to any disclaimer, the term of this patent is extended or adjusted under 35 U.S.C. 154(b) by 182 days.

(21) Appl. No.: 18/674,274

(22) Filed: May 24, 2024

(65) Prior Publication Data

US 2025/0363676 A1 Nov. 27, 2025

(51) Int. Cl.
*G06T 11/00* (2026.01)
*G06F 3/04845* (2022.01)
(Continued)

(52) U.S. Cl.
CPC .......... *G06T 11/00* (2013.01); *G06F 3/04845* (2013.01); *G06F 9/451* (2018.02); (Continued)

(58) Field of Classification Search
CPC ... G06T 11/00; G06T 5/20; G06T 5/70; G06T 7/136; G06T 7/194; G06T 2200/24; G06T 2207/20192; G06F 3/04845; G06F 9/451; G06N 3/045; G06N 3/047; G06N 3/0475; G06N 3/08; G06N 3/088; G06N 20/00
See application file for complete search history.

(56) References Cited

U.S. PATENT DOCUMENTS 9,361,701 B2 * 6/2016 Tizhoosh .................. G06T 7/12
9,530,243 B1 * 12/2016 Costello ................ G06T 15/503
(Continued)

FOREIGN PATENT DOCUMENTS

WO WO-2020148688 A1 * 7/2020 ............ G06F 16/58

OTHER PUBLICATIONS

Lai Z, Zhu X, Dai J, Qiao Y, Wang W. Mini-dalle3: Interactive text to image by prompting large language models. arXiv preprint arXiv:2310.07653. Oct. 11, 2023.*
(Continued)

*Primary Examiner* — Sarah Lhymn
(74) *Attorney, Agent, or Firm* — NovoTechIP International PLLC

(57) ABSTRACT

A data processing system includes a processor; and a memory in communication with the processor, the memory storing executable instructions that, when executed by the processor alone or in combination with other processors, cause the data processing system to perform functions of: receiving user input in text form describing a sticker pack a user wants to generate, a user interface prompting the user to enter the user input; generating a prompt using the user input and a prompt template that is specific to sticker pack generation; submitting the prompt to a generative artificial intelligence (GAI) to generate an image for the sticker pack; and segmenting and filtering the image from the GAI with a post-processing system to produce a completed pack of stickers usable by the user.

20 Claims, 13 Drawing Sheets

(51) Int. Cl.

| | |
|---|---|
| ***G06F 9/451*** | (2018.01) |
| ***G06T 5/20*** | (2006.01) |
| ***G06T 5/70*** | (2024.01) |
| ***G06T 7/136*** | (2017.01) |
| ***G06T 7/194*** | (2017.01) |

(52) U.S. Cl.

CPC .................. *G06T 5/20* (2013.01); *G06T 5/70* (2024.01); *G06T 7/136* (2017.01); *G06T 7/194* (2017.01); *G06T 2200/24* (2013.01); *G06T 2207/20192* (2013.01)

(56) References Cited

U.S. PATENT DOCUMENTS

| | | | | |
|---|---|---|---|---|
| 10,269,164 | B1 * | 4/2019 | Song | G06T 11/60 |
| 11,809,688 | B1 * | 11/2023 | Parasnis | G06F 3/04845 |
| 12,217,340 | B1 * | 2/2025 | Parasnis | G06F 16/9577 |
| 12,309,185 | B1 * | 5/2025 | Skarphedinsson | G06F 9/45533 |
| 12,354,138 | B2 * | 7/2025 | Behara | G06F 3/0488 |
| 2014/0161329 | A1 * | 6/2014 | Tizhoosh | G06T 7/149 382/128 |
| 2018/0210725 | A1 * | 7/2018 | Vaindiner | G06F 8/65 |
| 2018/0315107 | A1 * | 11/2018 | Connolly | G01C 21/206 |
| 2019/0310868 | A1 * | 10/2019 | Vaindiner | G06V 30/416 |
| 2019/0392492 | A1 * | 12/2019 | Archer | G06Q 30/0201 |
| 2021/0312523 | A1 * | 10/2021 | Luo | G06V 40/169 |
| 2021/0312678 | A1 * | 10/2021 | Luo | G06Q 30/0201 |
| 2022/0329871 | A1 * | 10/2022 | Afalki Beni | H04N 19/80 |
| 2022/0414346 | A1 * | 12/2022 | Chia | G06N 20/00 |
| 2023/0136013 | A1 * | 5/2023 | Goodrich | G06T 13/40 345/419 |
| 2023/0384922 | A1 * | 11/2023 | Harvill | G06F 3/04847 |
| 2024/0062008 | A1 * | 2/2024 | Ghosh | G06F 40/289 |
| 2024/0264723 | A1 * | 8/2024 | Davidson | G06N 3/045 |
| 2024/0281472 | A1 * | 8/2024 | LaRhette | G06F 16/9558 |
| 2024/0291779 | A1 * | 8/2024 | Catalano | H04L 51/02 |
| 2024/0354555 | A1 * | 10/2024 | Knipfing | G06N 3/0455 |
| 2024/0355064 | A1 * | 10/2024 | Skrypnyk | G06T 19/006 |
| 2024/0355065 | A1 * | 10/2024 | Miller | G06T 19/006 |
| 2024/0355131 | A1 * | 10/2024 | Kuppersmith | G06T 1/60 |
| 2024/0364645 | A1 * | 10/2024 | Zumbrunnen | G06F 3/04845 |
| 2024/0404225 | A1 * | 12/2024 | Ghosh | G06T 7/74 |
| 2024/0412433 | A1 * | 12/2024 | Smetanin | G06T 11/60 |
| 2025/0029348 | A1 * | 1/2025 | Zarkesh | G06T 19/20 |
| 2025/0046018 | A1 * | 2/2025 | Assouline | G06Q 30/0643 |
| 2025/0077582 | A1 * | 3/2025 | Tca | G06F 16/24578 |
| 2025/0131624 | A1 * | 4/2025 | Boyd | G06F 16/532 |
| 2025/0139229 | A1 * | 5/2025 | Mathur | G06F 21/53 |
| 2025/0139303 | A1 * | 5/2025 | Mathur | G06F 21/6245 |
| 2025/0148218 | A1 * | 5/2025 | Gusarov | G06T 19/006 |
| 2025/0148748 | A1 * | 5/2025 | Mathur | G06F 3/04842 |
| 2025/0157106 | A1 * | 5/2025 | Paga | G06T 11/60 |
| 2025/0174033 | A1 * | 5/2025 | Lin | G06V 30/148 |
| 2025/0200114 | A1 * | 6/2025 | Parasnis | G06N 3/047 |
| 2025/0200825 | A1 * | 6/2025 | An | G11B 27/031 |
| 2025/0232500 | A1 * | 7/2025 | Basher | G06F 40/40 |
| 2025/0265751 | A1 * | 8/2025 | Singh | G06T 11/60 |

OTHER PUBLICATIONS

Feit, Eran, "Image Segmentation in OpenCV with Python and Contours", Feb. 17, 2023 (https://eranfeit.net/image-segmentation-in-opencv-with-python-and-contours/), pp. 1-4.*

Arbelaez, P., Maire, M., Fowlkes, C., & Malik, J. (2010). Contour detection and hierarchical image segmentation. IEEE transactions on pattern analysis and machine intelligence, 33(5), 898-916.*

* cited by examiner

ELECTRONIC STICKER PACKS GENERATED BY ARTIFICIAL INTELLIGENCE BASED ON USER PROMPT

BACKGROUND

Electronic stickers, also known as digital stickers or e-stickers, represent a vibrant and interactive form of expression in the digital realm. Unlike emojis, which are standardized pictograms representing emotions or concepts, electronic stickers are often more elaborate and varied in their design, depicting characters or scenes. While emojis convey emotions and reactions succinctly, e-stickers offer users a broader range of expression, allowing them to add personality and creativity to their digital conversations. This versatility has contributed to the widespread popularity of electronic stickers across various online platforms and messaging services.

The history of electronic stickers can be traced back to the early 2010s with the emergence of messaging apps like Line and Telegram, which introduced sticker sets featuring colorful characters and animations. These stickers quickly gained popularity among users as a fun and engaging way to communicate beyond text. As the use of messaging apps and social media platforms continued to grow, electronic stickers became increasingly integrated into digital communication, evolving from novelty items to essential features of online interaction.

Today, electronic stickers can be found across a wide range of digital platforms and services, including popular social media platforms such as Facebook, Instagram, and Snapchat, as well as messaging apps like WhatsApp, WeChat, and Discord. Users have access to vast libraries of electronic stickers, which are often organized into themed sets or collections, catering to diverse interests and preferences. These stickers cover a broad spectrum of designs, from cute and whimsical characters to memes, pop culture references, and branded content.

Obtaining electronic stickers is relatively straightforward for users, with many platforms offering built-in sticker libraries or marketplaces where users can browse, purchase, or download sticker packs. Some stickers are freely available, while others may be offered as premium content or part of promotional campaigns. Overall, electronic stickers have become an integral part of online interaction, enriching conversations with their playful and expressive qualities.

SUMMARY

In one general aspect, the instant disclosure presents a data processing system that includes a processor; and a memory in communication with the processor, the memory storing executable instructions that, when executed by the processor alone or in combination with other processors, cause the data processing system to perform functions of: receiving user input in text form describing a sticker pack a user wants to generate, a user interface prompting the user to enter the user input, the user interface indicating a function to generate electronic stickers based on a theme of the user input for customizing the electronic stickers of the sticker pack; generating a prompt using the user input and a prompt template that is specific to sticker pack generation; submitting the prompt to a generative artificial intelligence (GAI) to generate an image for the sticker pack; and segmenting and filtering the image from the GAI with a post-processing system to produce a completed pack of stickers usable by the user.

In another general aspect, the following description provides a data processing system having a data center implementing a sticker pack generation service, the service includes: a network interface for receiving user input in text form describing a sticker pack a user wants to generate, the user input from a user interface indicating a function to generate electronic stickers based on a theme of the user input for customizing the electronic stickers of the sticker pack; a prompt generator for generating a prompt using the user input and a prompt template that is specific to sticker pack generation and for submitting the prompt to a generative artificial intelligence (GAI) to generate an image for the sticker pack; and a post-processing system for segmenting and filtering the image from the GAI to produce a completed pack of stickers usable by the user.

In another general aspect, the following description provides a method of producing a completed pack of electronic stickers based on a user description. The method includes: receiving user input in text form describing a sticker pack a user wants to generate, a user interface prompting the user to enter the user input, the user interface indicating a function to generate electronic stickers based on a theme of the user input for customizing the electronic stickers of the sticker pack; generating a prompt using the user input and a prompt template that is specific to sticker pack generation; submitting the prompt to a generative artificial intelligence (GAI) to generate an image for the sticker pack; and post-processing the image from the GAI with segmenting and filtering to produce the completed pack of stickers usable by the user.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
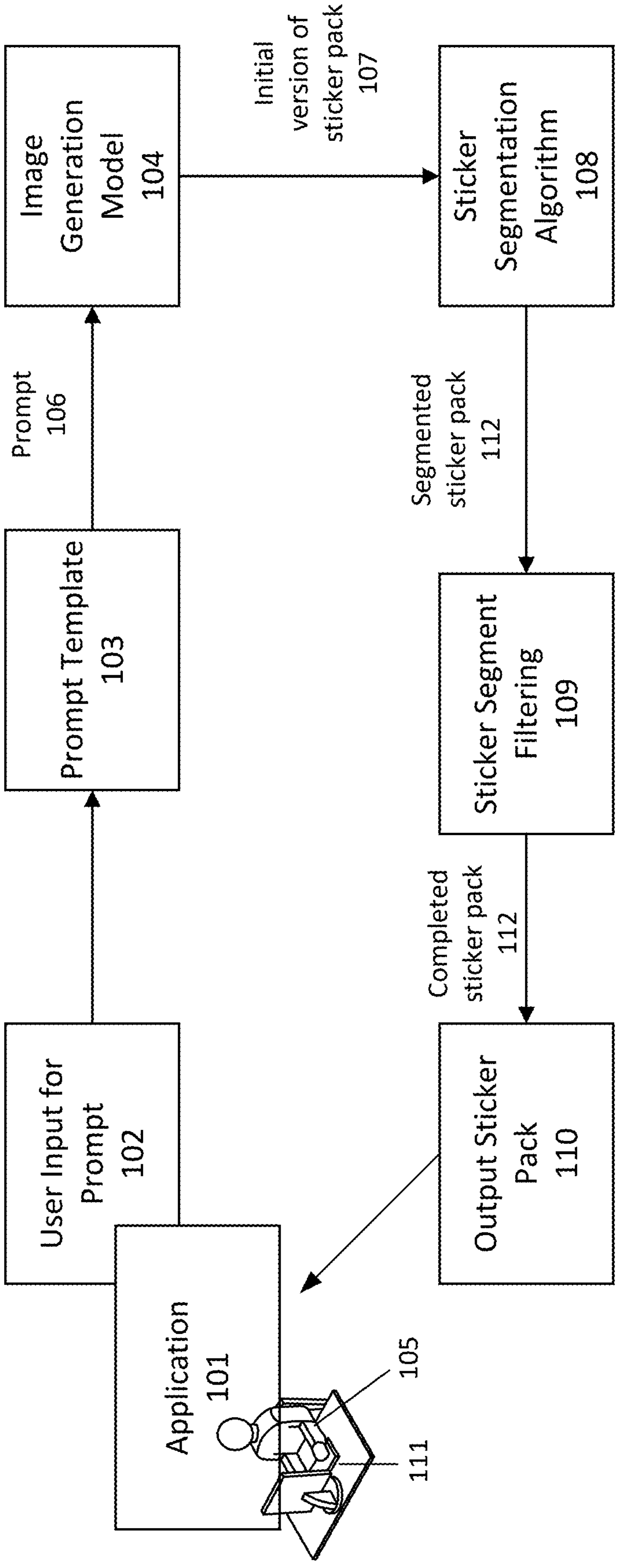
FIG. 1 depicts an example system and logical flow that implements aspects of technology being disclosed and described.

As noted above, electronic stickers have become an integral part of online interaction, enriching conversations with their playful and expressive qualities. However, users are typically confined to the stock stickers provided by the platform they are using. Additionally, it may be time consuming to browse through the catalog of available stickers to find out that more or less suits the current need of the user. If user are artistic, users can create their own custom stickers using specialized apps or platforms, allowing for personalized expression and creativity in digital communication. However, this requires a talent most users do not possess and, again, may be very time consuming.

Consequently, there is a technical problem presented to provide users with digital stickers meeting their immediate needs and without requiring searching through troves of stock stickers. The following describes electronic tools that provide a technical solution to this and other technical problems in the creation and use of digital stickers. These technical solutions leverage generative artificial intelligence, but also provide additional tools to support the user and solve the issues surrounding the creation of customized or individual electronic stickers.

Generative artificial intelligence (GAI) represents a fascinating branch of machine learning focused on the creation of new data that mimics real-world examples. At its core, generative AI aims to simulate human-like creativity and imagination, enabling computers to generate content such as images, music, and text autonomously. The underlying principle behind generative AI involves training neural networks to learn the underlying patterns and structures of a given dataset, allowing them to generate novel samples that resemble the original data.

One of the key techniques in generative AI is the use of Generative Adversarial Networks (GANs), where two neural networks, the generator and discriminator, engage in a competitive process to produce increasingly realistic outputs. The generator creates new samples, while the discriminator distinguishes between real and generated data. Through iterative training, both networks improve their performance, resulting in the generation of high-quality, realistic content.

This approach has led to significant advancements in image synthesis, a branch of which is referred to as text-to-image. With text-to-image GAI models, the user enters a textual description of an image that the user wants. The GAI model then utilizes its training to generate a unique image based on and corresponding to the text description input by the user. These cutting-edge models, exemplified by innovations such as OpenAI's DALL-E, have demonstrated a remarkable ability to generate detailed and coherent images based on textual descriptions, pushing the boundaries of generative AI and opening new avenues for creative expression and problem-solving.

As used herein, the term "sticker" will refer to an electronic sticker or e-sticker, rather than to a traditional printed and adhesive sticker. As described above, electronic stickers are ubiquitously used in social media, Short Message Service (SMS) or text messaging, direct messaging applications, email and other forms of electronic communication.

As used herein the term "sticker pack" will refer to a set of multiple stickers based on a common theme and sharing similar elements.

As will be described further below, an AI Sticker Pack is a feature that allows users to create unique and artistic packs of stickers based on a text description using generative AI. They can then use these stickers to express a variety of moods and emotions on social media and other platforms. The features described use a combination of deep learning, image processing, and post-processing techniques to generate an attractive and useful custom sticker pack. This is intended to provide a fun and creative way for users to express their ideas by adding stickers to their graphic designs, blog posts and other artifacts.

FIG. 1 depicts an example system and logical flow that implements aspects of technology being disclosed and described. As shown in FIG. 1, a user 105 may be using an application 101 on a computer or workstation 111. The application 101 could be any of a variety of applications such as a design application, social media application or other communication application. The feature being described herein to generate desired stickers and sticker packs may be implemented as a mini-application in the application 101 or may be a web service that is called by the application 101. In either case, the user 105 inputs a description in text of the sticker or sticker pack that the user would like to generate. This is referred to as the user input 102 for a GAI prompt.

The user textual description is then incorporated into a prompt template 103 to generate the prompt 106 that is to be submitted to the GAI or image generation model 104. As noted above, DALL-E 3 is a current example of an image generation model that might be used by the system. The prompt template 103 provides the actual instruction to the GAI to generate a sticker pack based on the user input 102. For example, if the user input 102 is represented by #USER_PROMPT, the prompt template could be the following: "Generate #STICKER_COUNT unique stickers on the theme '#USER_PROMPT', white border, vibrant colors, digital art, placed on a solid black background with ample space between them."

To generate the prompt 106 using this prompt template 103, #USER_PROMPT is replaced by the textual description in the user input 102 for the sticker set to be generated. #STICKER_COUNT is replaced by the number of stickers needed in the pack. This could be an amount specified in the user input 102 or, if there is no such quantity specified by the user, could be a default number such as 4 or 6 to give the user sufficient variety in the sticker pack from which to select.

The prompt 106, based on the prompt template 103 and including the user input 102, is then input to the GAI or image generation model 104. The GAI 104 outputs an initial version of the sticker pack 107. As will be described in more detail below, this initial version 107 will need additional post-processing for optimal use as a sticker pack. Accordingly, the feature of FIG. 1 then uses an image processing algorithm based on hierarchical contour detection and other operations such as erosion, dilation and blurring to identify the black slots, their locations, sizes, and orientations.

For example, the initial version of the sticker pack 107 is input to a sticker segmentation algorithm 108. This is a specific application of an image segmentation algorithm. An image segmentation algorithm is a computational method used in computer vision to partition an image into multiple segments or regions based on certain characteristics or features. The primary goal of image segmentation is to simplify the representation of an image by dividing it into meaningful parts, which can then be analyzed or processed independently. This process is crucial for various tasks in image analysis, such as object detection, recognition, and scene understanding. Image segmentation algorithms typically employ a combination of techniques, including pixel-wise classification, clustering, and boundary detection, to delineate the boundaries between different objects or regions in an image. These algorithms may utilize various criteria, such as color, texture, intensity, or spatial proximity, to group pixels into coherent segments. Additionally, advanced segmentation methods may incorporate machine learning algorithms, such as convolutional neural networks (CNNs), to automatically train and extract relevant features for segmentation tasks. Overall, image segmentation algorithms play a vital role in extracting meaningful information from images and enabling computers to understand and interpret visual data more effectively.

Next, the segmented sticker pack 112 is input to a sticker segment filtering algorithm 109. This segment filtering algorithm 109 can remove partial images, such as images partially cut off at the boundary of the initial image 107 or other image artifacts. Specifically, these post-processing techniques are used to filter out invalid cases, such as filtering out invalid contours on basis of area and incomplete stickers. The result is a completed sticker pack 112. This completed sticker pack 112 is the output 110 to the user 105 via the user interface of the application 101.

Figure 2:
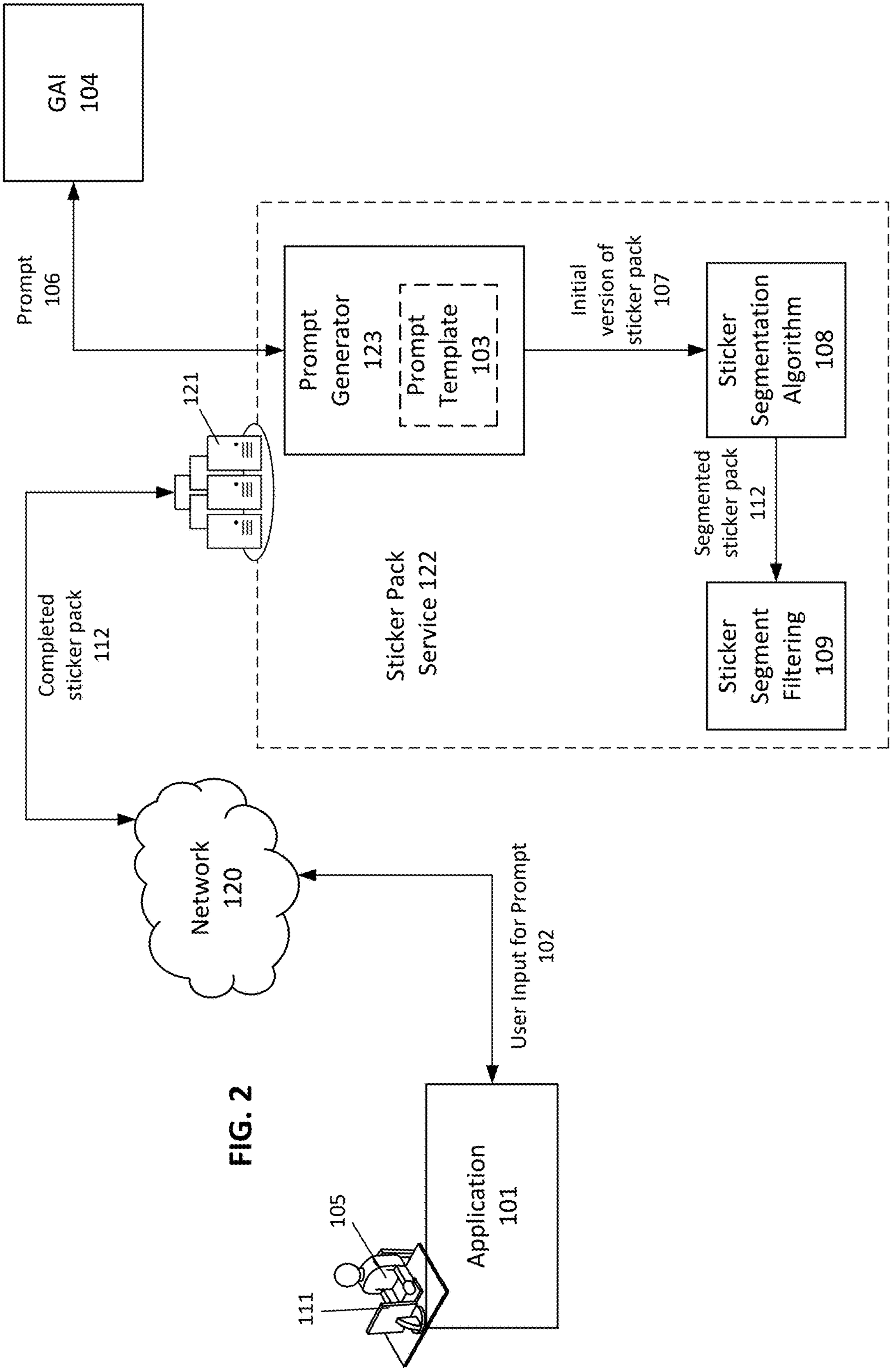
FIG. 2 depicts additional details of the example system and logical flow of FIG. 1 that implements aspects of technology being disclosed and described.

FIG. 2 depicts additional details of the example system and logical flow of FIG. 1 that implements aspects of technology being disclosed and described. As shown in FIG. 2, the depiction again begins with the user 105 operating the computer or workstation 111 with the application 101. In this example, the features described are implemented as a web service 122, referred to as the sticker pack service, that is called by the application 101 under direction of the user 105.

As in FIG. 1, the user provides input 102 including a textual description of the sticker pack to be generated. This input is sent by the application 101 via a network 120 to a datacenter 121 that implements the sticker pack service 122. The service 122 includes a prompt generator 123. As described above, the prompt generator 123 will utilize a prompt template 103. The prompt template 103 includes instructions to the GAI 104 to generate a sticker pack and may include specific stipulations such as spacing, background, layout, etc. By including the user input 102 in the prompt template 103, the prompt generator 123 finalizes the prompt 106 that is then submitted to the GAI 104.

As also described above, the GAI 104 will output an initial version of the sticker pack 107 that is received by the service 122 in response to the prompt 106. This initial version of the sticker pack 107 is then subjected to post-processing. As described above, this may include a sticker segmentation algorithm 108 and then a sticker segment filtering algorithm 109. The resulting completed sticker pack 112 is then provided by the service 122, via the network 120, to the application 101 and user 105.

Figure 3A:
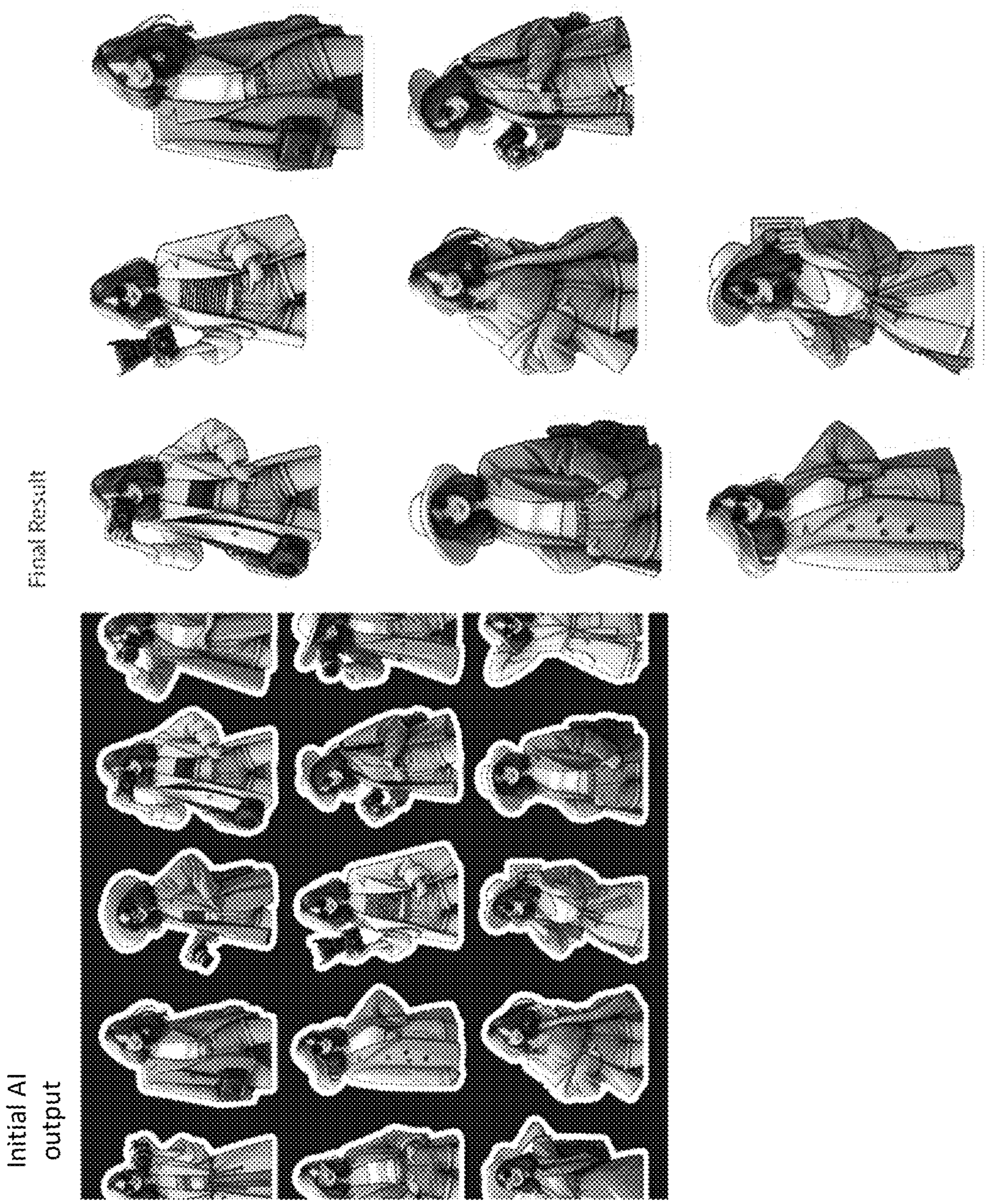
FIGS. 3A-3D depict examples of sticker packs that could be produced by the system of FIG. 2 including both initial and finished outputs at the points in the logical flow indicated.

FIGS. 3A-3D depict examples of sticker packs that could be produced by the system of FIG. 2 including both initial and finished outputs at the points in the logical flow indicated. FIG. 3A depicts an example sticker pack generated from the user description of "girl wearing oversized blazer holding a camera in her hand smiling."

The left panel depicts the initial output provided by the GAI in response to this user description incorporated into a prompt template, as described above. Per the example prompt template described above, the generated image contains multiple stickers with ample space between them placed on a solid dark background.

The right panel depicts the final result after the initial GAI output has been through the post-processing techniques noted above and described in more detail below. As shown on the right, individual stickers have been segmented from the initial AI output and finalized for individual use. Images that were only partially created in the initial AI output have been discarded leaving only complete images in the final sticker pack. Again, this post-processing will be described in detail below.

Figure 3B:
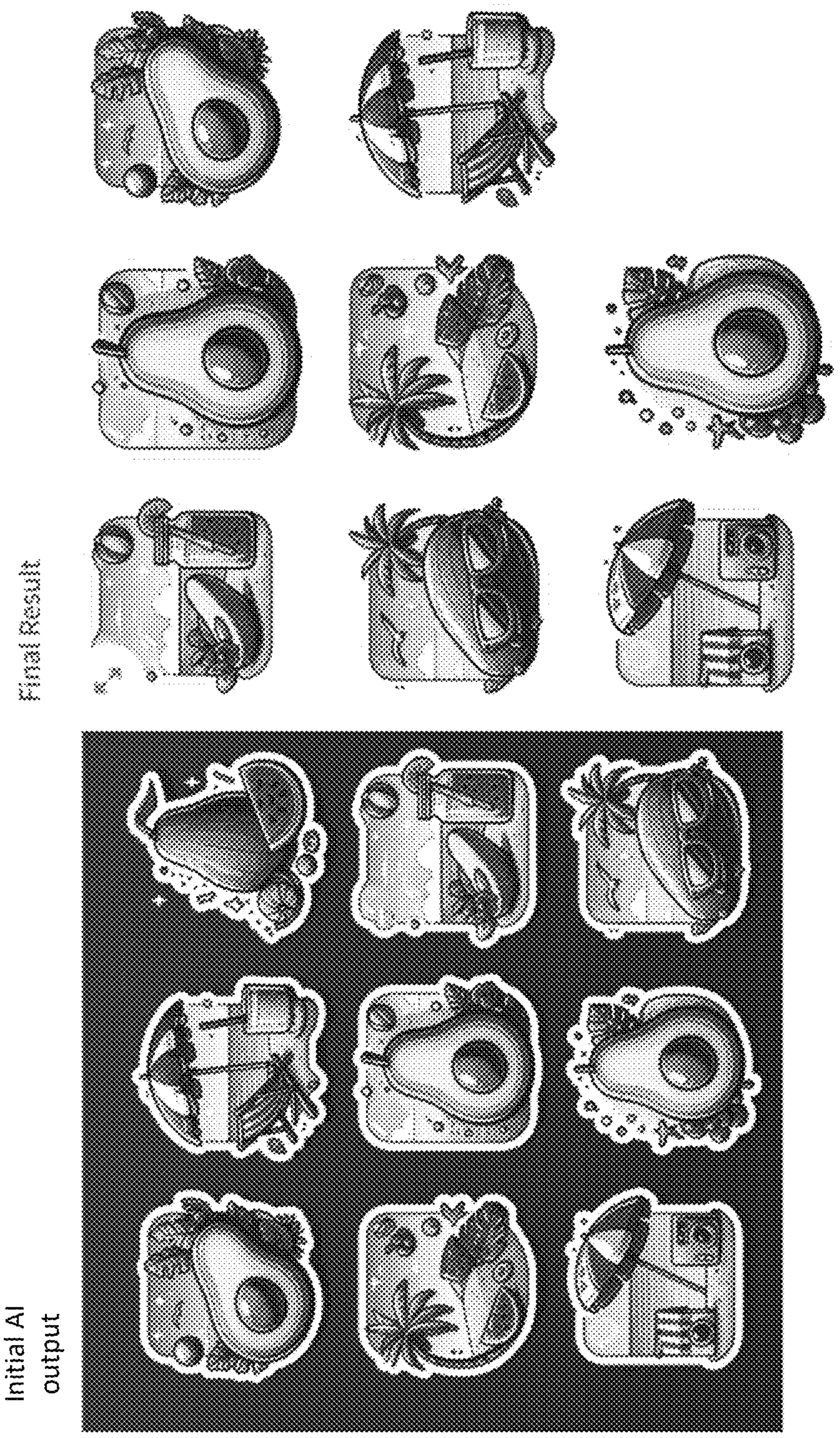
Figure 3C:
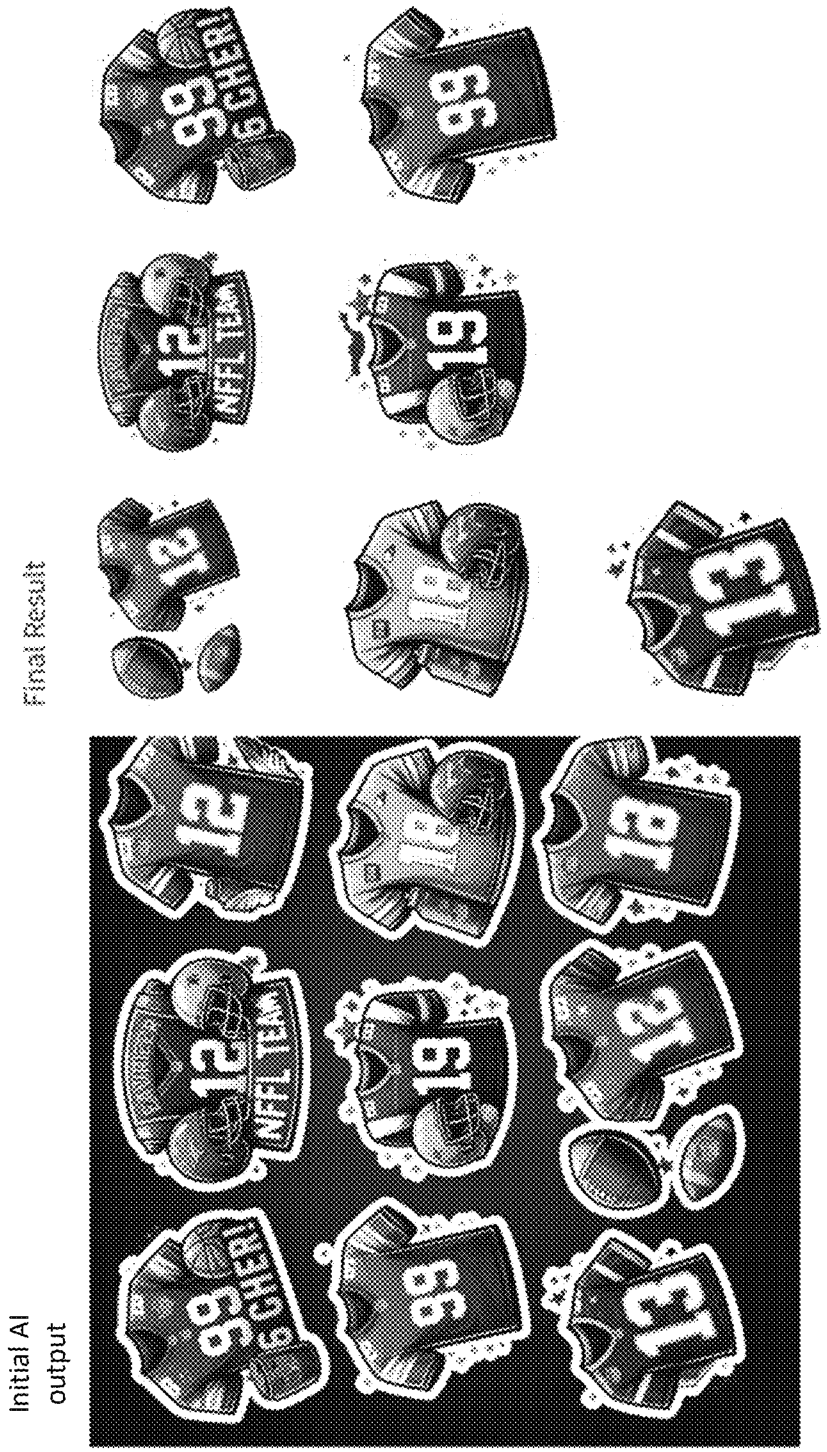
Figure 3D:
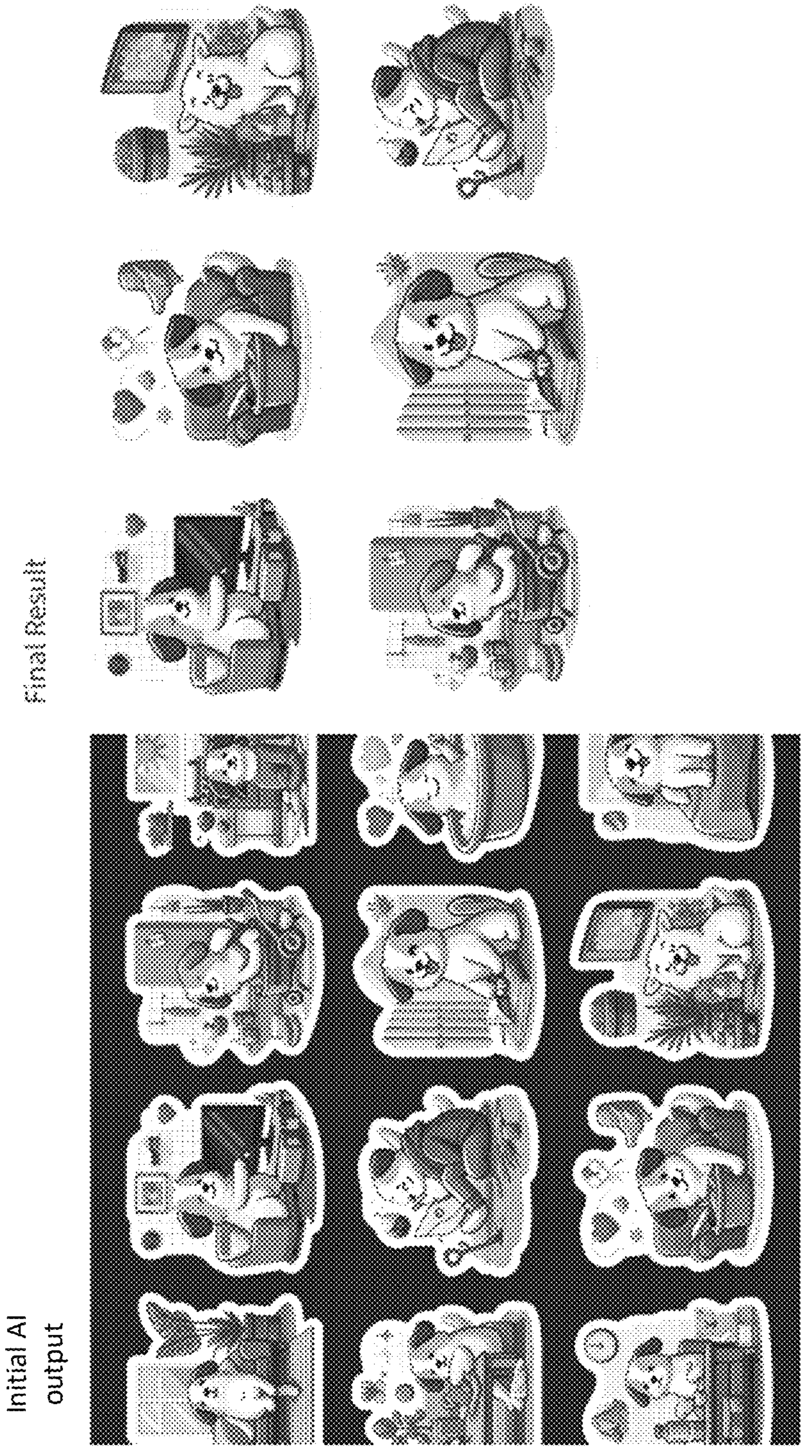

FIG. 3B depicts an example sticker pack generated from the user description of "avocado on beach vacation." FIG. 3C depicts an example sticker pack generated from the user description of "cheer for football team with blue and gold jersey." FIG. 3D depicts an example sticker pack generated from the user description of "dog doing different activities at home."

Figure 4A:
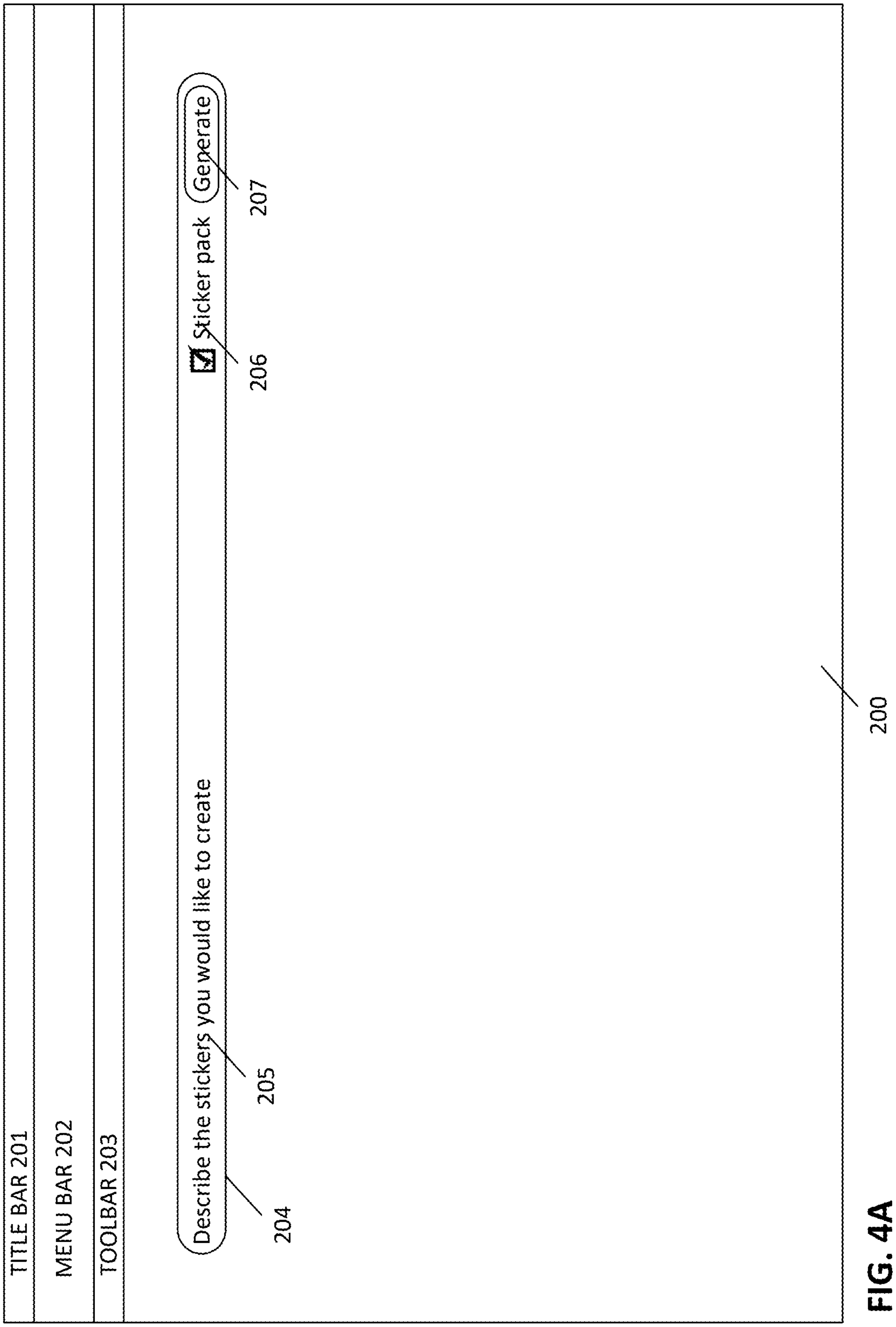
FIGS. 4A-4C depict an example user interface of the system of FIG. 2 at different points in the logical flow indicated.
Figure 4B:
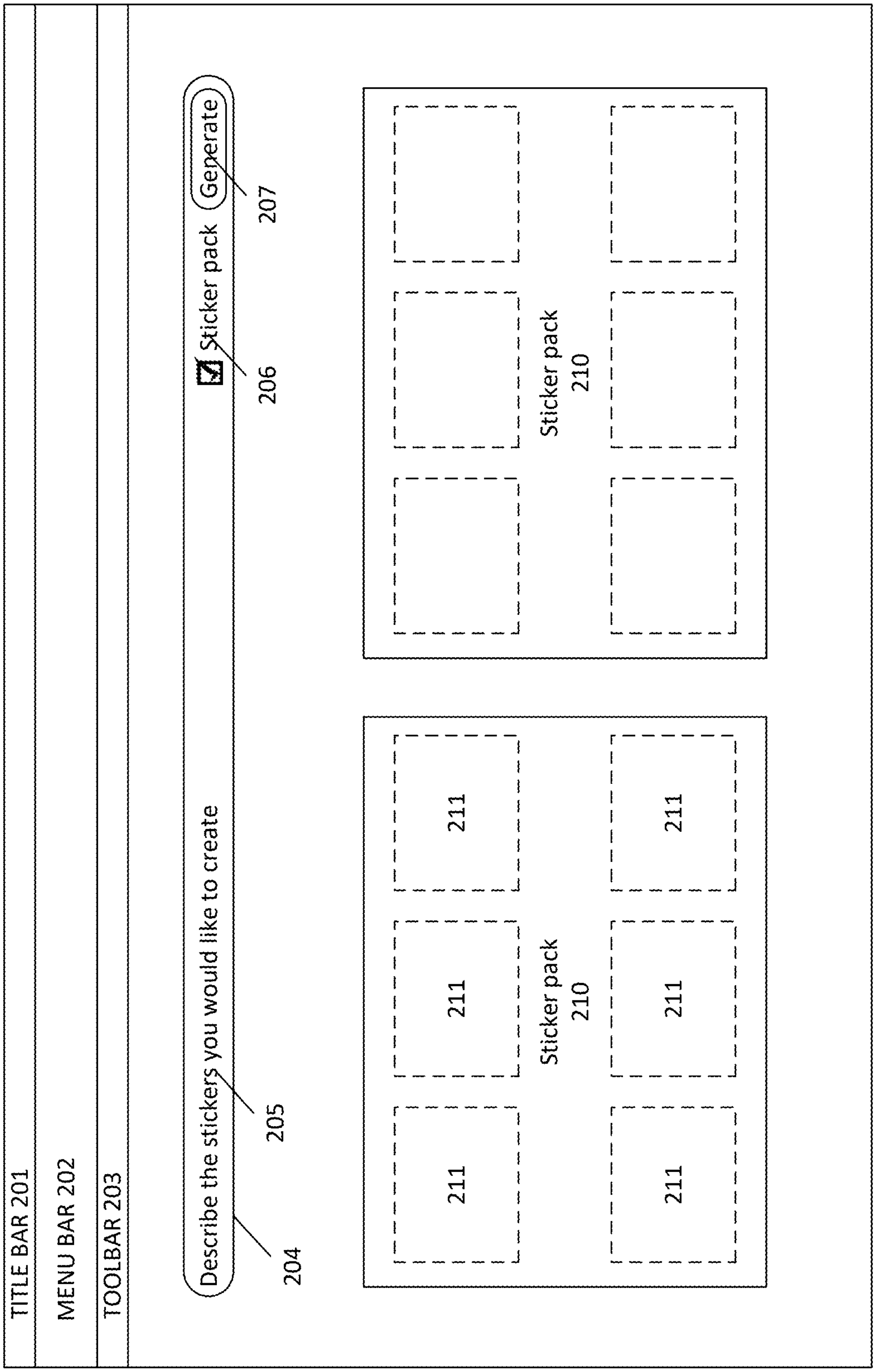
Figure 4C:
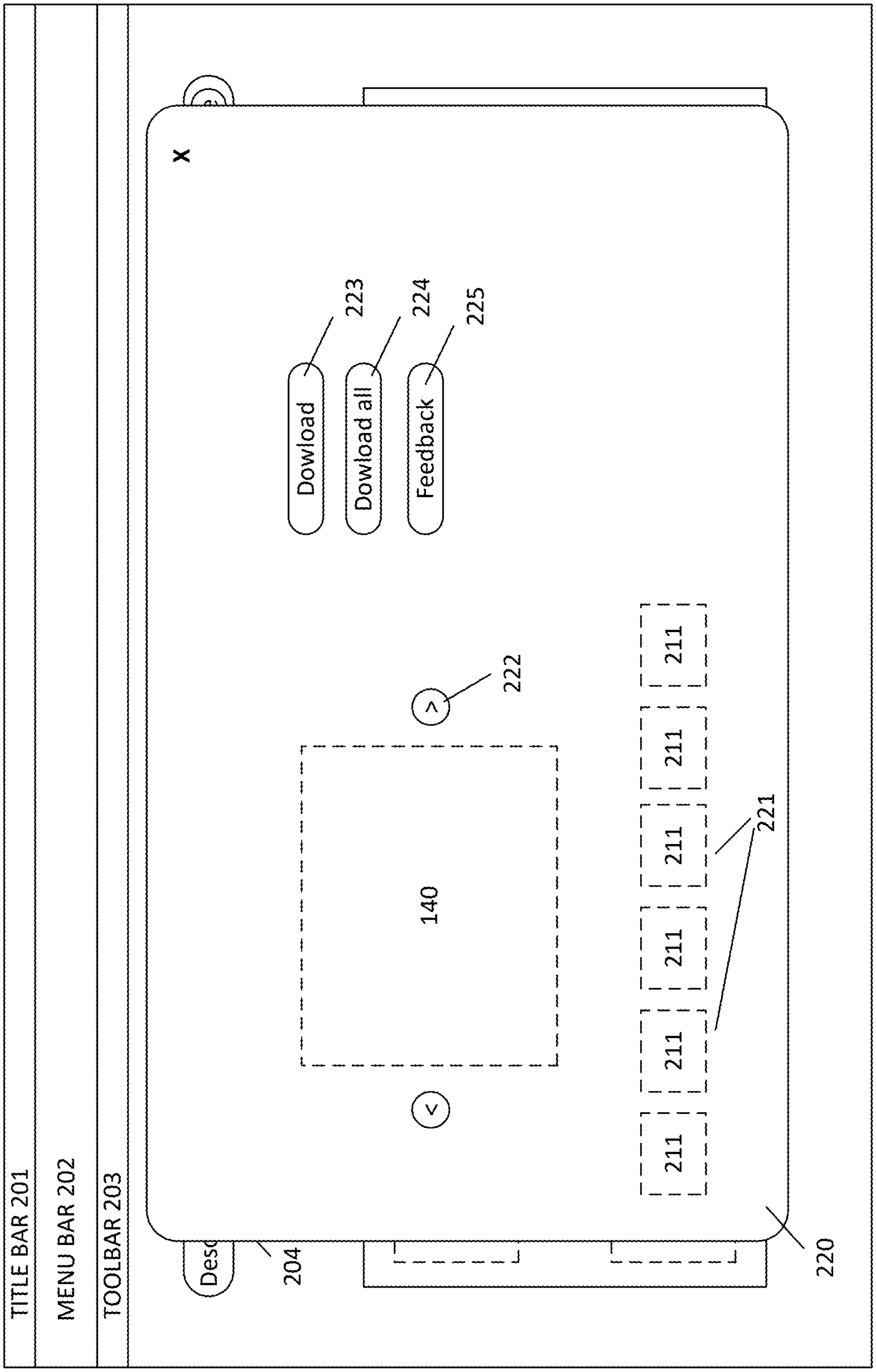

FIGS. 4A-4C depict an example user interface of the system of FIG. 2 at different points in the logical flow indicated. As shown in FIG. 4A, the user interface 200 may have a title bar 201, menu bar 202 and toolbar 203. These may be for the application 101 or may be specific to the feature or mini-application of generating a sticker pack.

Next, the interface 200 includes a text box 204 in which the user can enter a textual description of the stickers that the user wants to create. A written prompt 205 may be included to guide the user to enter the description in the box 204.

A checkbox 206 can be provided that indicates "sticker pack." If this box is not checked, the system can generate a single sticker rather than multiple stickers in a set or pack. Lastly, a button 207 may be marked "generate" and is selected after the user has entered the description of the stickers in the box 204. Clicking this button causes the system to begin the process described above, to generate the stickers for the user.

FIG. 4B illustrates an example of the interface after sticker packs have been generated. As shown in FIG. 4B, the generated sticker pack or packs 210 are displayed for review by the user. Each sticker pack 210 includes some number of individual stickers 211.

The user interface may also include features that allow the user to more closely inspect the individual stickers. In FIG. 4C, the user has selected one of the sticker packs 210. This may be done by simply clicking on one of the packs 210 displayed in FIG. 4B. This results in a pop-up view 220. In this view 220, the stickers 211 of the selected pack are displayed in an array 221. One of these stickers 211 is also displayed in a much larger form 140 for closer inspection by the user. Arrow controls 222 allow the user to move the enlarged view 140 among all of the stickers in the array 221.

The pop-up 220 may also include controls for once the user is satisfied and wants to use one or more of the stickers 211. For example, a download button 223 is provided to allow the user to download the sticker currently shown in the enlarged view 140. An image file for the selected sticker may then be downloaded to the user's system and can be added to the sticker library of any platform, such as a messaging or communications application, where the user desires to utilize the sticker.

The controls of the pop-up 220 may also include a download all button 224. This control allows the user to download the entire sticker pack with one action. In some examples, image files for all the stickers in the pack may be downloaded in a compressed file or compressed format to the user's system. Again, the user can then utilize the individual files or add the stickers to the library of a platform for subsequent use.

Lastly, the controls of the pop-up 220 may include a feedback button 225. This allows the user to provide feedback on the process and the quality of the stickers produced. This feedback may be used by the service developers to further refine training of the GAI or other aspects of the system to better serve the needs of the user.

Figure 5:
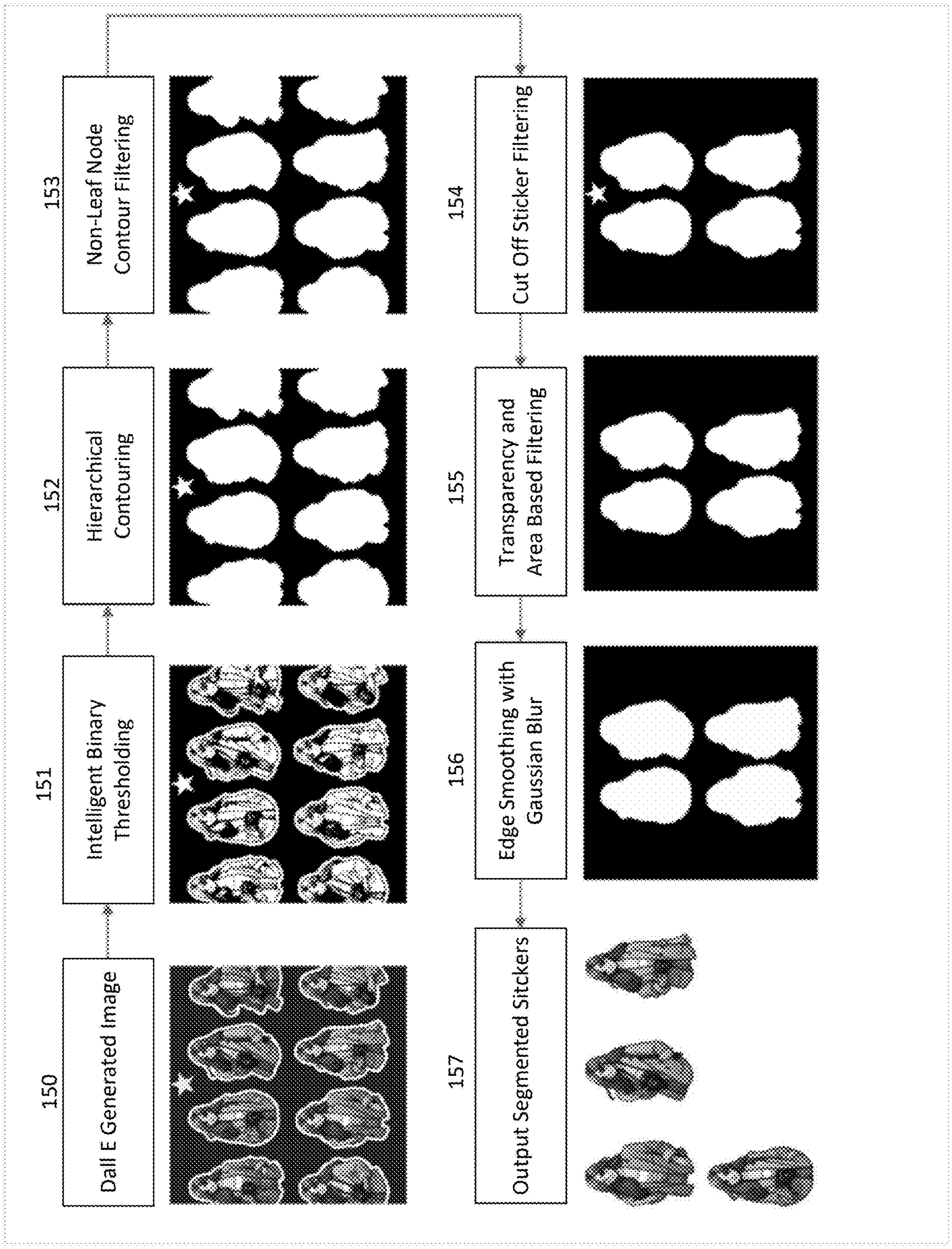
FIG. 5 depicts the post-processing flow implemented by the example system of FIG. 2.

FIG. 5 depicts the post-processing flow implemented by the example system of FIG. 2. As shown in FIG. 5, the process begins with the GAI generated image 150. In this example, the GAI used is DALL-E. The image 150 includes a variety of images spaced on a black background consistent with the prompt template described above. The image also includes a star that the GAI has included as what is referred to as an AI hallucination.

Next, the image is processed with intelligent binary thresholding 151. Intelligent binary thresholding is a technique used in image processing and computer vision to segment images into foreground and background regions based on pixel intensity values. Unlike traditional fixed thresholding methods, which rely on a predetermined threshold value to separate foreground and background pixels, intelligent binary thresholding dynamically selects an optimal threshold value based on the characteristics of the image itself. This adaptive approach enables more robust and accurate segmentation, particularly in cases where lighting conditions or image characteristics vary significantly. Intelligent binary thresholding algorithms often analyze local pixel intensity distributions or statistical properties of the image to determine an optimal threshold dynamically. Common methods include Otsu's method, adaptive thresholding, and entropy-based thresholding. By adjusting the threshold value dynamically, intelligent binary thresholding algorithms can effectively separate objects of interest from the background in images, facilitating subsequent image analysis and processing tasks.

The result is then processed with hierarchical contouring 152. Hierarchical contouring is a method used in computer vision and image processing for detecting and representing contours in images at multiple levels of detail. Contours, in this context, refer to the outlines or boundaries of objects or regions within an image. In hierarchical contouring, the contours are organized in a hierarchical structure, often resembling a tree-like or nested arrangement. This hierarchical representation allows for the efficient storage and analysis of contours at different levels of abstraction, from coarse outlines to fine details. The process typically involves detecting edges or regions of interest in the image and then grouping them into larger contours based on certain criteria, such as proximity, similarity in shape or intensity, or spatial relationships. These larger contours are then recursively subdivided into smaller contours, creating a hierarchical structure that captures the hierarchical organization of objects and features in the image.

After the hierarchical contouring is completed, the image can be filtered with non-leaf node contour filtering 153. Non-leaf node contour filtering is a technique used in hierarchical contouring, which involves the filtering or selection of contours at non-leaf nodes in the contour hierarchy. In hierarchical contouring, contours are organized in a tree-like structure, with each node representing a contour at a certain level of detail. Leaf nodes represent the finest level of detail, typically corresponding to individual edges or small segments in the image, while non-leaf nodes represent larger, composite contours formed by grouping multiple child contours.

Non-leaf node contour filtering focuses on selecting or prioritizing non-leaf nodes based on certain criteria, such as contour size, shape complexity, or relevance to the task at hand. By filtering non-leaf nodes, the contour hierarchy can be pruned or simplified, retaining only the most salient or significant contours at higher levels of abstraction. This filtering process helps reduce the complexity of the contour representation while preserving important structural information about objects or regions in the image.

Non-leaf node contour filtering is commonly used in various applications of hierarchical contouring, such as object recognition, image segmentation, and scene analysis. By selecting meaningful contours at different levels of abstraction, non-leaf node contour filtering enables more efficient and effective processing of images, leading to improved performance in tasks such as object detection, shape analysis, and image understanding.

The result is then processed with cut off filtering 154. The filtering removes figures within the image that are incomplete, such as figures located at, and extending beyond, the edge or boundary of the image. As shown in FIG. 5, when prompted as described herein, the GAI may sometimes create an image with figures that match the description but that are incomplete in that they are cut off by the edge or boundary of the overall image. Such figures, being incomplete, will not make satisfactory stickers for the desired sticker pack and should be discarded. The cut off filtering will also remove small superfluous objects, such as the illustrated star, that the GAI may have included in the image inconsistent with the description of the prompt.

In the context of hierarchical contouring or contour-based image processing, cut off filtering refers to a technique used to selectively remove or retain contours based on certain criteria, typically related to their size or significance. Cut off filtering involves setting a threshold value or criterion, beyond which contours are either retained or discarded. Contours that meet or exceed the specified criterion are retained, while those that fall below it are filtered out or discarded.

For example, in the context of non-leaf node contour filtering, cut off filtering may involve setting a minimum threshold for the size or area of contours at non-leaf nodes. Contours that represent objects or regions smaller than the specified threshold are filtered out, while larger, more significant contours are retained.

Cut off filtering is often used to simplify or refine the representation of contours in an image, focusing on retaining only the most relevant or significant contours while filtering out noise or irrelevant details. By adjusting the cut off threshold, the level of detail and abstraction in the contour representation can be controlled, allowing for tailored processing and analysis of images based on specific requirements or objectives.

After the cut off filtering 154, the result is subjected to transparency and area-based filtering 155. Transparency and area-based filtering are techniques used in image processing and computer vision to filter or manipulate objects or regions within an image based on their transparency levels and areas, respectively.

Transparency filtering involves selectively processing or manipulating regions of an image based on their transparency levels. In digital images, transparency is often represented using an alpha channel, where pixel values determine the opacity or transparency of the corresponding image regions. Transparency filtering allows for the selective manipulation, enhancement, or removal of transparent regions within an image. For example, in image compositing or overlay applications, transparency filtering can be used to blend multiple images or layers together while preserving the transparency information of each layer.

Area-based filtering, on the other hand, involves filtering or selecting objects or regions within an image based on their areas or sizes. This technique is often used to segment or extract objects of interest from an image based on their spatial extent. For example, in object detection or image segmentation tasks, area-based filtering can be used to remove small or insignificant objects or noise from an image, focusing only on larger, more salient regions. By setting a threshold on the minimum or maximum area of objects, area-based filtering enables the selective extraction or processing of objects based on their sizes.

Lastly, the image data is processed with edge smoothing with a Gaussian blur. Edge smoothing with a Gaussian blur is a technique used in image processing to reduce the sharpness of edges in an image, resulting in a smoother appearance. This technique is achieved by applying a Gaussian blur filter to the image, which convolves the image with a Gaussian kernel.

The Gaussian blur filter works by averaging the pixel values in the neighborhood of each pixel, with the weights of the averaging determined by a Gaussian distribution. Pixels closer to the center of the kernel have higher weights, while pixels farther away have lower weights. This creates a smoothing effect that gradually diminishes as the distance from the center increases. When applied to an image, the Gaussian blur filter blurs the edges between regions of differing intensity or color, resulting in a gradual transition instead of a sharp boundary. This helps to reduce the appearance of noise and imperfections in the image while preserving overall image details.

This post-processing results in a set of segmented stickers 157 that are suitable for user review and utilization. Thus, the set of individual stickers is then output by the system.

Figure 6:
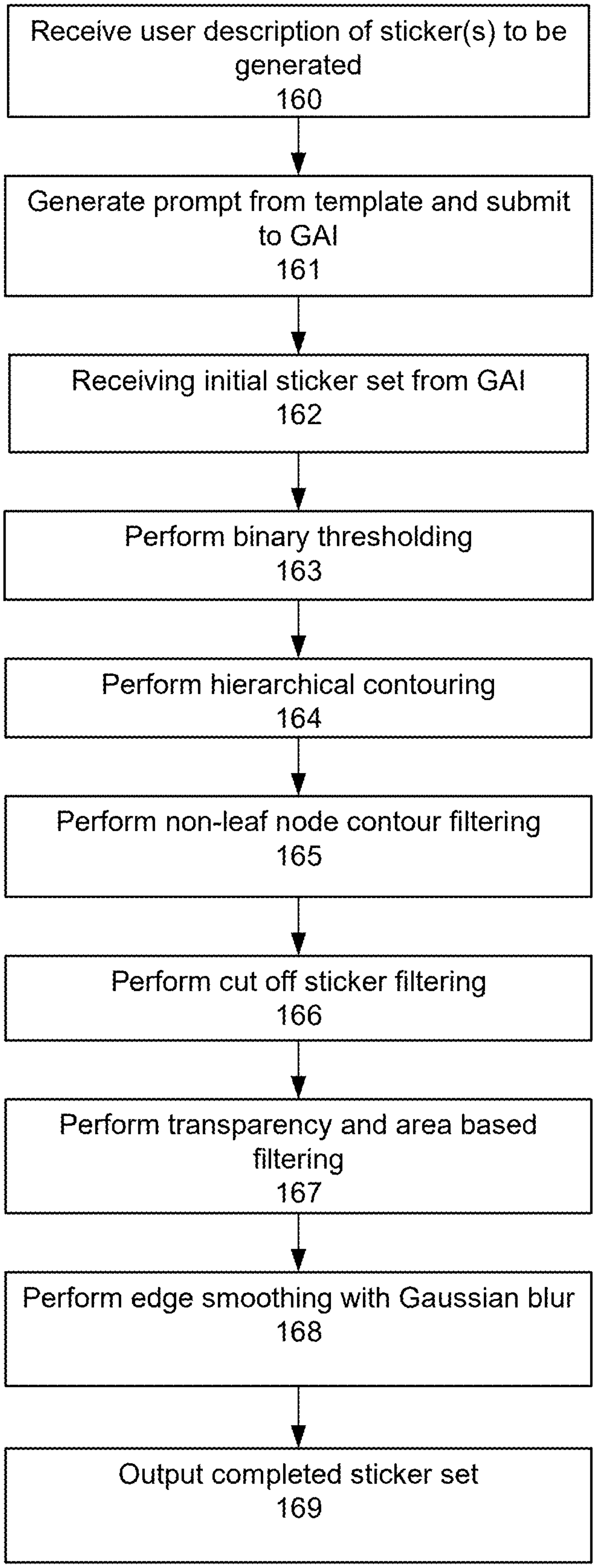
FIG. 6 is a flowchart illustrating the logical flow implemented by the example system of FIG. 2.

FIG. 6 is a flowchart illustrating the logical flow implemented by the example system of FIG. 2. As shown in FIG. 6, the method begins with receiving the user description of the stickers to be generated 160. The system then generates a prompt 161 from a template and submits the completed prompt to the GAI. The initial sticker image or set is then received from the GAI 162.

As described in FIG. 5, the initial sticker image set is then subjected to post-generation processing or post-processing to provide optimized images and segmented individual stickers suitable for use. The post-processing includes binary thresholding 163, hierarchical contouring 164, non-leaf node contour filtering 165, cut off filtering 166, transparency and area-based filtering 167 and edge smoothing with Gaussian blur 168. The method then concludes with the output of the completed sticker set 169, as described above.

Figure 7:
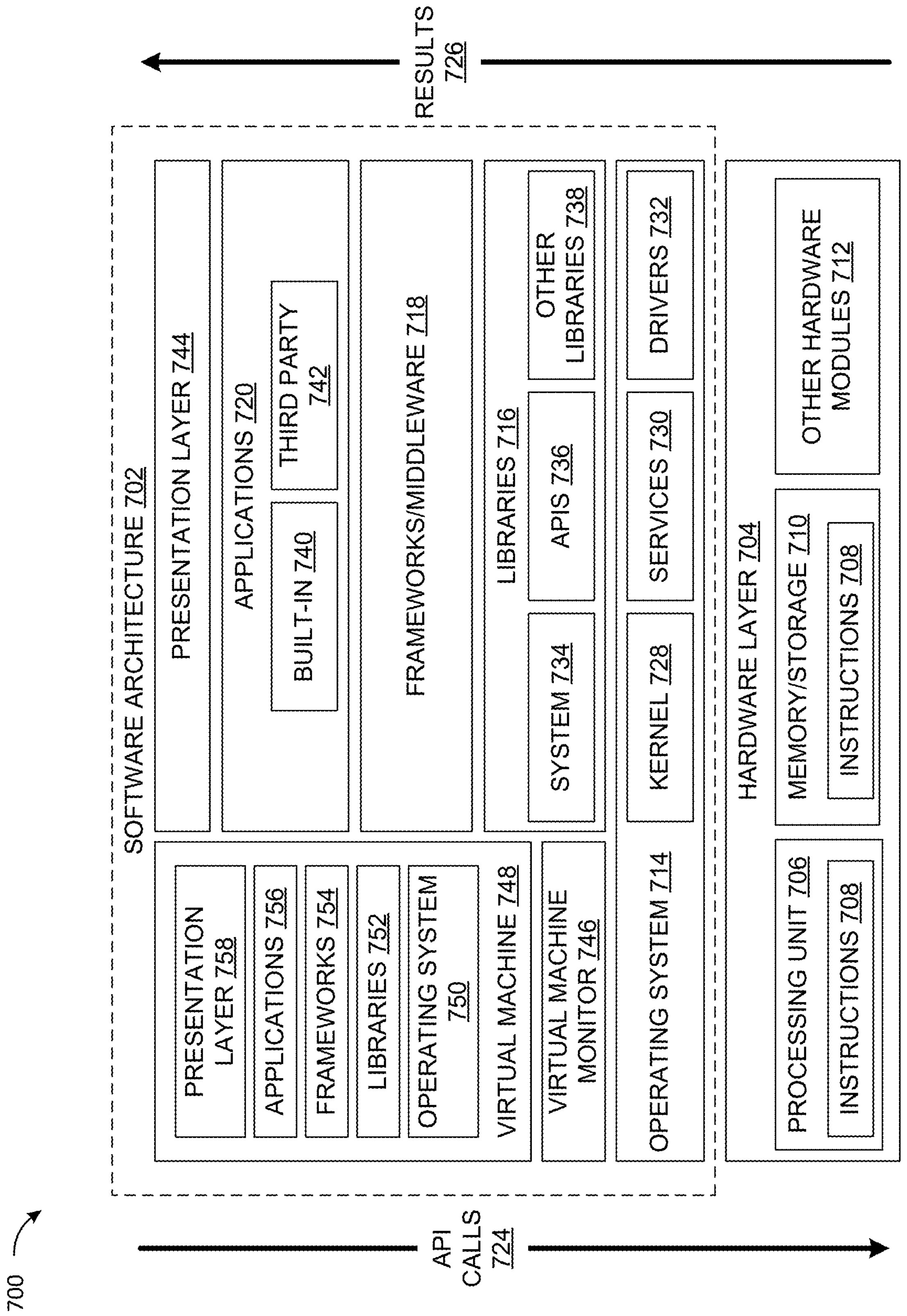
FIG. 7 is a block diagram illustrating an example software architecture, various portions of which may be used in conjunction with various hardware architectures herein described.

FIG. 7 is a block diagram 700 illustrating an example software architecture 702 that could be used to support the sticker generation service described herein or the application or mini-application with the sticker generation feature. Various portions of this architecture 702 may be used in conjunction with various hardware architectures herein described, which may implement any of the above-described features. FIG. 7 is a non-limiting example of a software architecture, and it will be appreciated that many other architectures may be implemented to facilitate the functionality described herein. The software architecture 702 may execute on hardware such as a machine 800 of FIG. 8 that includes, among other things, processors 810, memory 830, and input/output (I/O) components 850. A representative hardware layer 704 is illustrated and can represent, for example, the machine 800 of FIG. 8. The representative hardware layer 704 includes a processing unit 706 and associated executable instructions 708. The executable instructions 708 represent executable instructions of the software architecture 702, including implementation of the methods, modules and so forth described herein. The hardware layer 704 also includes a memory/storage 710, which also includes the executable instructions 708 and accompanying data. The hardware layer 704 may also include other hardware modules 712. Instructions 708 held by processing unit 706 may be portions of instructions 708 held by the memory/storage 710.

The example software architecture 702 may be conceptualized as layers, each providing various functionality. For example, the software architecture 702 may include layers and components such as an operating system (OS) 714, libraries 716, frameworks 718, applications 720, and a presentation layer 744. Operationally, the applications 720 and/or other components within the layers may invoke API calls 724 to other layers and receive corresponding results 726. The layers illustrated are representative in nature and other software architectures may include additional or different layers. For example, some mobile or special purpose operating systems may not provide the frameworks/middleware 718.

The OS 714 may manage hardware resources and provide common services. The OS 714 may include, for example, a kernel 728, services 730, and drivers 732. The kernel 728 may act as an abstraction layer between the hardware layer 704 and other software layers. For example, the kernel 728 may be responsible for memory management, processor management (for example, scheduling), component management, networking, security settings, and so on. The services 730 may provide other common services for the other software layers. The drivers 732 may be responsible for controlling or interfacing with the underlying hardware layer 704. For instance, the drivers 732 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 716 may provide a common infrastructure that may be used by the applications 720 and/or other components and/or layers. The libraries 716 typically provide functionality for use by other software modules to perform tasks, rather than rather than interacting directly with the OS 714. The libraries 716 may include system libraries 734 (for example, C standard library) that may provide functions such as memory allocation, string manipulation, file operations. In addition, the libraries 716 may include API libraries 736 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 716 may also include a wide variety of other libraries 738 to provide many functions for applications 720 and other software modules.

The frameworks 718 (also sometimes referred to as middleware) provide a higher-level common infrastructure that may be used by the applications 720 and/or other software modules. For example, the frameworks 718 may provide various graphic user interface (GUI) functions, high-level resource management, or high-level location services. The frameworks 718 may provide a broad spectrum of other APIs for applications 720 and/or other software modules.

The applications 720 include built-in applications 740 and/or third-party applications 742. Examples of built-in applications 740 may include, but are not limited to, a contacts application, a browser application, a location application, a media application, a messaging application, and/or a game application. Third-party applications 742 may include any applications developed by an entity other than the vendor of the particular platform. The applications 720 may use functions available via OS 714, libraries 716, frameworks 718, and presentation layer 744 to create user interfaces to interact with users.

Some software architectures use virtual machines, as illustrated by a virtual machine 748. The virtual machine 748 provides an execution environment where applications/modules can execute as if they were executing on a hardware machine (such as the machine 800 of FIG. 8, for example). The virtual machine 748 may be hosted by a host OS (for example, OS 714) or hypervisor, and may have a virtual machine monitor 746 which manages operation of the virtual machine 748 and interoperation with the host operating system. A software architecture, which may be different from software architecture 702 outside of the virtual machine, executes within the virtual machine 748 such as an OS 750, libraries 752, frameworks 754, applications 756, and/or a presentation layer 758.

Figure 8:
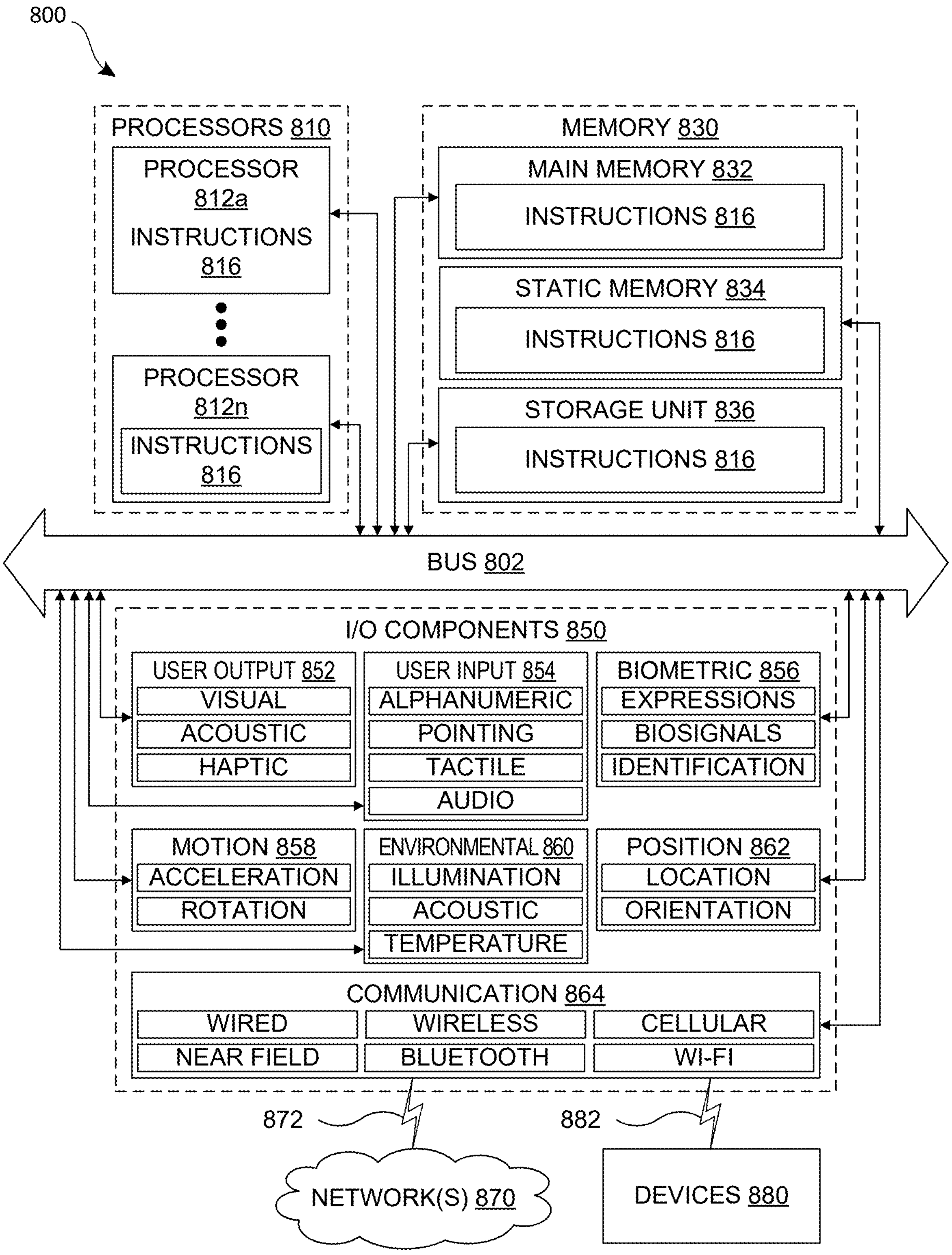
FIG. 8 is a block diagram illustrating components of an example machine configured to read instructions from a machine-readable medium and perform any of the features described herein.

FIG. 8 is a block diagram illustrating components of an example machine 800 configured to read instructions from a machine-readable medium (for example, a machine-readable storage medium) and perform any of the features described herein. The example machine 800 is in a form of a computer system, within which instructions 816 (for example, in the form of software components) for causing the machine 800 to perform any of the features described herein may be executed.

As such, the instructions 816 may be used to implement modules or components described herein. The instructions 816 cause unprogrammed and/or unconfigured machine 800 to operate as a particular machine configured to carry out the described features. The machine 800 may be configured to operate as a standalone device or may be coupled (for example, networked) to other machines. In a networked deployment, the machine 800 may operate in the capacity of a server machine or a client machine in a server-client network environment, or as a node in a peer-to-peer or distributed network environment. Machine 800 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 800 is illustrated, the term "machine" includes a collection of machines that individually or jointly execute the instructions 816.

The machine 800 may include processors 810, memory 830, and I/O components 850, which may be communicatively coupled via, for example, a bus 802. The bus 802 may include multiple buses coupling various elements of machine 800 via various bus technologies and protocols. In an example, the processors 810 (including, for example, a central processing unit (CPU), a graphics processing unit (GPU), a digital signal processor (DSP), an ASIC, or a suitable combination thereof) may include one or more processors 812*a* to 812*n* that may execute the instructions 816 and process data. In some examples, one or more processors 810 may execute instructions provided or identified by one or more other processors 810. The term "processor" includes a multi-core processor including cores that may execute instructions contemporaneously. Although FIG. 8 shows multiple processors, the machine 800 may include a single processor with a single core, a single processor with multiple cores (for example, a multi-core processor), multiple processors cach with a single core, multiple processors cach with multiple cores, or any combination thereof. In some examples, the machine 800 may include multiple processors distributed among multiple machines.

The memory/storage 830 may include a main memory 832, a static memory 834, or other memory, and a storage unit 836, both accessible to the processors 810 such as via the bus 802. The storage unit 836 and memory 832, 834 store instructions 816 embodying any one or more of the functions described herein. The memory/storage 830 may also store temporary, intermediate, and/or long-term data for processors 810. The instructions 816 may also reside, completely or partially, within the memory 832, 834, within the storage unit 836, within at least one of the processors 810 (for example, within a command buffer or cache memory), within memory at least one of I/O components 850, or any suitable combination thereof, during execution thereof. Accordingly, the memory 832, 834, the storage unit 836, memory in processors 810, and memory in I/O components 850 are examples of machine-readable media.

As used herein, "machine-readable medium" refers to a device able to temporarily or permanently store instructions and data that cause machine 800 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 816) for execution by a machine 800 such that the instructions, when executed by one or more processors 810 of the machine 800, cause the machine 800 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 850 may include a wide variety of hardware components adapted to receive input, provide output, produce output, transmit information, exchange information, capture measurements, and so on. The specific I/O components 850 included in a particular machine will depend on the type and/or function of the machine. For example, mobile devices such as mobile phones may include a touch input device, whereas a headless server or IoT device may not include such a touch input device. The particular examples of I/O components illustrated in FIG. 8 are in no way limiting, and other types of components may be included in machine 800. The grouping of I/O components 850 are merely for simplifying this discussion, and the grouping is in no way limiting. In various examples, the I/O components 850 may include user output components 852 and user input components 854. User output components 852 may include, for example, display components for displaying information (for example, a liquid crystal display (LCD) or a projector), acoustic components (for example, speakers), haptic components (for example, a vibratory motor or force-feedback device), and/or other signal generators. User input components 854 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 850 may include biometric components 856, motion components 858, environmental components 860, and/or position components 862, among a wide array of other physical sensor components. The biometric components 856 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 858 may include, for example, acceleration sensors (for example, an accelerometer) and rotation sensors (for example, a gyroscope). The environmental components 860 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 862 may include, for example, location sensors (for example, a Global Position System (GPS) receiver), altitude sensors (for example, an air pressure sensor from which altitude may be derived), and/or orientation sensors (for example, magnetometers).

The I/O components 850 may include communication components 864, implementing a wide variety of technologies operable to couple the machine 800 to network(s) 870 and/or device(s) 880 via respective communicative couplings 872 and 882. The communication components 864 may include one or more network interface components or other suitable devices to interface with the network(s) 870. The communication components 864 may include, for example, components adapted to provide wired communication, wireless communication, cellular communication, Near Field Communication (NFC), Bluetooth communication, Wi-Fi, and/or communication via other modalities. The device(s) 880 may include other machines or various peripheral devices (for example, coupled via USB).

In some examples, the communication components 864 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 864, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-6) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the foregoing detailed description, numerous specific details were set forth by way of examples in order to provide a thorough understanding of the relevant teachings. It will be apparent to persons of ordinary skill, upon reading the description, that various aspects can be practiced without such details. In other instances, well known methods, procedures, components, and/or circuitry have been described at a relatively high-level, without detail, in order to avoid unnecessarily obscuring aspects of the present teachings.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
- a processor; and
- a memory in communication with the processor, the memory comprising executable instructions that, when executed by the processor alone or in combination with other processors, cause the data processing system to perform functions of:
  - receiving, via a user interface, user input in text form describing a sticker pack a user wants to generate, wherein:
    - the user input includes a theme and a desired number of unique electronic stickers, and
    - the sticker pack comprises a plurality of unique electronic stickers that share the theme;
  - generating a prompt using a prompt template that includes instructions to generate the sticker pack according to the desired number of unique electronic stickers and the theme to be shared among the desired number of unique electronic stickers;
  - submitting the prompt to a generative artificial intelligence (GAI) to generate an image for the sticker pack;
  - receiving the image for the sticker pack generated by the GAI;
  - processing, by intelligent binary thresholding, the image to produce a segmented image;
  - processing, by hierarchical contouring, the segmented image to produce a contoured image;
  - processing, by non-leaf node contour filtering, the contoured image to produce a filtered contoured image;
  - processing, with cut-off filtering, the filtered contoured image to remove superfluous objects from the filtered contoured image;
  - processing, with transparency and area-based filtering, the filtered contoured image to filter objects from the filtered contoured image based on transparency levels and areas;
  - processing, with edge smoothing with a Gaussian blur, the filtered contoured image to obtain edge smoothing of the objects in the filtered contoured image to produce a set of segmented stickers; and
  - displaying the set of segmented stickers on the user interface.

2. The data processing system of claim 1, wherein the user interface comprises a text box to receive text describing the sticker pack with the prompt to the user to enter a description of the sticker pack.

3. The data processing system of claim 2, wherein the user interface further comprises a generate button to initiate generation of the prompt.

4. The data processing system of claim 1, the user interface including a control to allow the user to expand and inspect the sticker pack in a pop-up view.

5. The data processing system of claim 4, wherein the pop-up view comprises an enlarged view of one of the unique electronic stickers of the sticker pack and controls to move each of the unique electronic stickers of the sticker pack into the enlarged view.

6. The data processing system of claim 4, wherein the pop-up view comprises controls to download the unique electronic stickers of the sticker pack for use on a platform utilized by the user for communication.

7. The data processing system of claim 1, wherein a post-processing system comprises intelligent binary thresholding.

8. The data processing system of claim 7, wherein the post-processing system further comprises hierarchical contouring.

9. The data processing system of claim 8, wherein the post-processing system further comprises non-leaf node contour filtering.

10. The data processing system of claim 9, wherein the post-processing system further comprises cut off filtering.

11. The data processing system of claim 10, wherein the post-processing system further comprises transparency and area-based filtering.

12. The data processing system of claim 11, wherein the post-processing system further comprises edge smoothing with Gaussian blur.

13. A data processing system comprising a data center implementing a sticker pack generation service, the sticker pack generation service further comprising:

a network interface for receiving user input in text form describing a sticker pack a user wants to generate, the user input from a user interface indicating a function to generate electronic stickers based on a theme of the user input for customizing the electronic stickers of the sticker pack, wherein the user input includes a theme and a desired number of unique electronic stickers, and the sticker pack comprises a plurality of unique electronic stickers that share the theme;

a prompt generator for generating a prompt using a prompt template that includes instructions to generate the sticker pack according to the desired number of unique electronic stickers and the theme to be shared among the desired number of unique electronic stickers and for submitting the prompt to a generative artificial intelligence (GAI) to generate an image for the sticker pack; and a post-processing system, further including:

receiving the image for the sticker pack generated by the GAI;

processing, by intelligent binary thresholding, the image to produce a segmented image;

processing, by hierarchical contouring, the segmented image to produce a contoured image;

processing, by non-leaf node contour filtering, the contoured image to produce a filtered contoured image;

processing, with cut-off filtering, the filtered contoured image to remove superfluous objects from the filtered contoured image;

processing, with transparency and area-based filtering, the filtered contoured image to filter objects from the filtered contoured image based on transparency levels and areas;

processing, with edge smoothing with a Gaussian blur, the filtered contoured image to obtain edge smoothing of the objects in the filtered contoured image to produce a set of segmented stickers; and displaying the set of segmented stickers on the user interface.

14. The data processing system of claim 13, wherein the user interface further includes a text box to receive text describing the sticker pack with the prompt to the user to enter a description of the sticker pack.

15. The data processing system of claim 14, wherein the user interface further a generate button to initiate generation of the prompt.

16. The data processing system of claim 13, the user interface further including a control to allow the user to expand and inspect the sticker pack in a pop-up view, wherein the pop-up view comprises an enlarged view of one of the unique electronic stickers of the sticker pack and controls to move each of the unique electronic stickers of the sticker pack into the enlarged view; and controls to download the unique electronic stickers of the sticker pack for use on a platform utilized by the user for communication.

17. The data processing system of claim 13, wherein the post-processing system comprises intelligent binary thresholding, hierarchical contouring, non-leaf node contour filtering, cut off filtering, transparency and area-based filtering and edge smoothing with Gaussian blur.

18. A method of producing a completed pack of electronic stickers based on a user description, the method comprising:

receiving, via a user interface, user input in text form describing a sticker pack a user wants to generate, the user interface prompting the user to enter the user input and indicating a function to generate unique electronic stickers based on a theme of the user input for customizing the electronic stickers of the sticker pack wherein the sticker pack comprises a plurality of unique electronic stickers that share the theme;

generating a prompt using a prompt template that includes instructions to generate the sticker pack according to a desired number of unique electronic stickers and the theme to be shared among the desired number of unique electronic stickers;

submitting the prompt to a generative artificial intelligence (GAI) to generate an image for the sticker pack;

receiving the image for the sticker pack generated by the GAI;

processing, by intelligent binary thresholding, the image to produce a segmented image;

processing, by hierarchical contouring, the segmented image to produce a contoured image;

processing, by non-leaf node contour filtering, the contoured image to produce a filtered contoured image;

processing, with cut-off filtering, the filtered contoured image to remove superfluous objects from the filtered contoured image;

processing, with transparency and area-based filtering, the filtered contoured image to filter objects from the filtered contoured image based on transparency levels and areas;

processing, with edge smoothing with a Gaussian blur, the filtered contoured image to obtain edge smoothing of the objects in the filtered contoured image to produce a set of segmented stickers; and displaying the set of segmented stickers on the user interface.

19. The method of claim 18, wherein the user interface further includes a control to allow the user to expand and inspect the sticker pack in a pop-up view that comprises an enlarged view of one of the unique electronic stickers of the sticker pack and controls to move each of the unique electronic stickers of the sticker pack into the enlarged view to download the unique electronic stickers of the sticker pack for use on a platform utilized by the user for communication.

20. The method of claim 18, wherein post-processing comprises intelligent binary thresholding, hierarchical contouring, non-leaf node contour filtering, cut off filtering, transparency and area-based filtering and edge smoothing with Gaussian blur.

* * * * *